Oct. 11, 1960 — J. E. KINSELLA — 2,955,828
GRAIN DISTRIBUTOR WITH ADJUSTABLE FUNNEL
Filed May 20, 1958
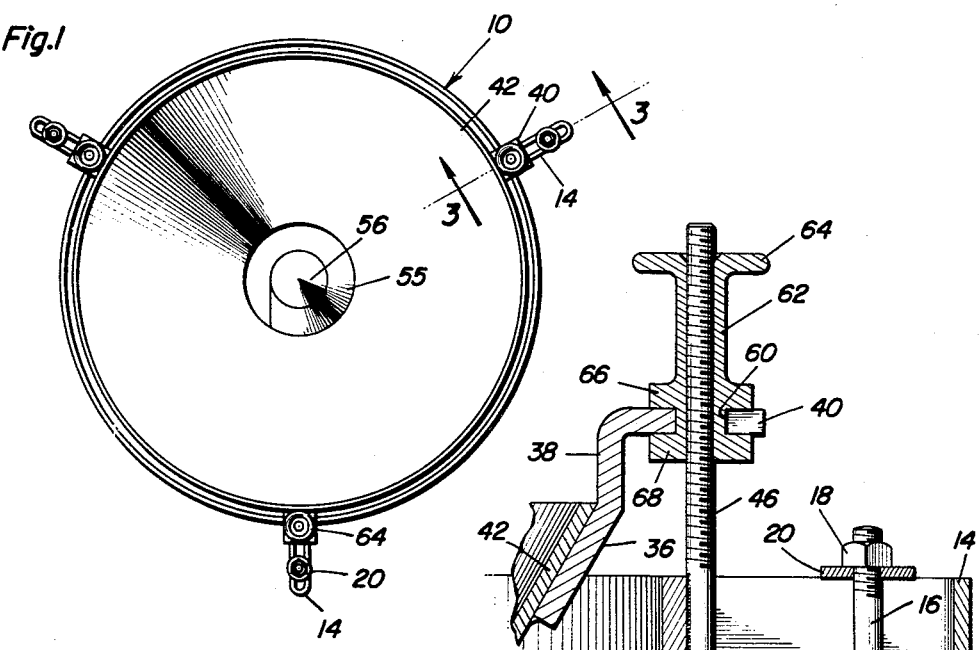
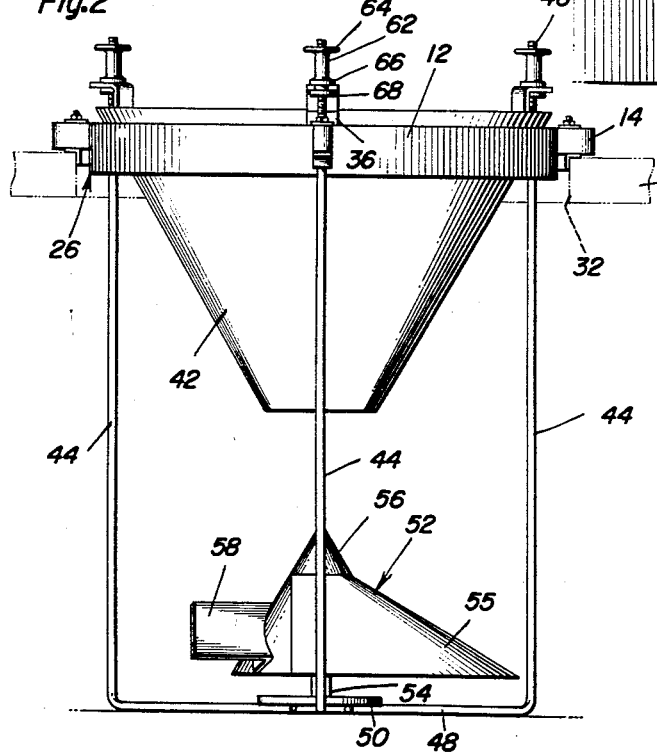
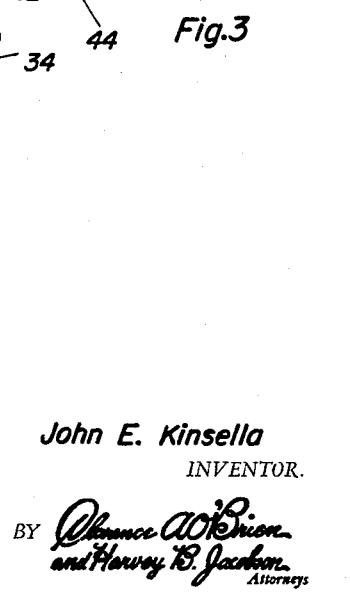
John E. Kinsella
INVENTOR.

United States Patent Office 2,955,828
Patented Oct. 11, 1960

2,955,828

GRAIN DISTRIBUTOR WITH ADJUSTABLE FUNNEL

John E. Kinsella, Merna, Ill.

Filed May 20, 1958, Ser. No. 736,527

3 Claims. (Cl. 275—15)

The present invention generally relates to a grain distributor and more particularly a grain distributor having an adjustable funnel or hopper and constitutes an improvement on Patent No. 2,687,892, issued August 31, 1954 for Grain Distributor.

The primary object of the present invention is to provide a grain distributor mountable within the inlet opening of a grain bin for effectively scattering the grain as the grain is dropped through the inlet opening, the hopper or funnel portion of the grain distributor being adjustable in relation to the deflector for accurately orientating the axis of rotation of the deflector and the longitudinal axis of the hopper or funnel.

In the storage of grain in bins and warehouses, there is a problem of concentration of foreign material in the grain, the foreign material including chaff, dirt and kernels of grain having a high moisture content. Also, when the grain is conveyed into a bin, all of the grain will hit in one spot adjacent the center or some point within the bin with a considerable force of impact thus causing the grain to pile in one area rather than be evenly distributed. Also, the high moisture kernels would normally be concentrated if the grain were dumped directly into a bin due to the physical qualities of the high moisture content kernels as well as the foreign material. The present invention including the deflector rotated by the contact of grain therewith and the adjustable hopper substantially eliminates these problems and effectively distributes the grain including the high moisture kernels and also any foreign material evenly throughout the bin so that air circulation throughout the stored grain will be uniform.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the grain distributor of the present invention;

Figure 2 is an elevational view of the present invention mounted on a grain bin which is shown in dotted lines; and Figure 3 is a vertical sectional view on an enlarged scale taken substantially upon a plane passing along section line 3—3 of Figure 1.

Referring now specifically to the drawings, the numeral 10 generally designates the distributor of the present invention which includes an annular ring 12 that is provided with a plurality of equally spaced and radially projecting U-shaped arms 14 secured rigidly thereto as by welding or the like. Each of the arms 14 slidably supports fastening bolts 16 having a clamp nut 18 and washer 20 on top and a tapered head 22 with a tool receiving slot 24 therein, the head 22 being recessed in an angle iron cleat 26 which includes a vertical leg 27 and a horizontal leg 28, the head 22 being received in a countersunk aperture 30 in the horizontal leg 28. By manually loosening and tightening the nuts 18, the cleats 26 may be adjusted and locked in a radially adjusted position for engagement of the outer surface of the vertical leg 27 with the edge of an inlet or filling opening 32 in a grain bin wall or top 34, thus supporting the ring 12 on the grain bin wall.

A floating funnel 42 extends through the ring 12 and is provided with a plurality of circumferentially spaced outwardly and upwardly inclined lugs 36, each lug 36 being provided with a vertical extension 38 at the upper end thereof and with a horizontal lug 40 at the upper end of the extension 38. The lug 36, extension 38 and lug 40 are in vertical alignment with the respective U-shaped arms 14. The inner surface of the inclined lug 36 receives a portion of the upper surface of the frusto-conical hopper or funnel 42 which is rigidly affixed to the lugs 36 as by welding or the like. The upper end of the funnel 42 is enlarged for receiving grain from a suitable conveyor (not shown) and the lower end of the funnel 42 is smaller for discharging grain therefrom.

Extending through each of the U-shaped brackets 14 and welded to the ring 12 is an elongated vertically disposed rod 44 having an elongated externally threaded upper end portion 46. The lower ends of the rods 44 are turned inwardly and designated by the numeral 48 and are terminally secured to a central plate 50 which rotatably supports a deflector generally designated by the numeral 52. The deflector 52 is identical to the deflector 36 shown in Patent No. 2,687,892 and is rotatably supported on a post 54 and includes a spiral-like member having a downwardly and outwardly sloping wall 55 that progressively increases radially outwardly from the axis of the spiral-like member in a clockwise direction. The upper end of wall 55 is cast with a frusto-conical tip portion 56 and also a vertically inclined fin 58 is provided on the portion 55. This portion of the structure is the same as that in Patent No. 2,687,892.

Each horizontal lug 40 is provided with a central aperture 60 through which the threaded portion 46 of the rod 44 extends and an elongated tubular nut 62 is threaded on the threaded portion 46 and includes a handle portion or knurled knob 64 which may be in the form of a knurled hand wheel. Adjacent the lower end of the cylindrical sleeve-like nut 62 there is provided a pair of spaced sleeves or flanges 66 and 68 which are disposed on opposite sides of the lug 40 respectively and retain the lug 40 therebetween thus permitting rotation of the sleeve-like nut 62 but preventing longitudinal movement of the sleeve-like nut 62 in relation to the lug 40 whereby rotation of the sleeve-like lug 62 will raise or lower the portion of the funnel 42 to which that particular lug 40 is attached thus providing an adjustment whereby the funnel may not only be raised and lowered relative to the deflector 52, but may also be tilted in any direction so that its longitudinal axis is either vertical and coincident with the axis of the deflector, or is angularly offset therefrom, thus facilitating discharge of grain from the funnel either directly to the center of the deflector or to one side portion thereof, as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a grain distributor, the combination of a mounting ring, a rotatable grain deflector supported by the ring in downwardly spaced relation therefrom, a funnel extending through the ring and having its lower end disposed above said deflector, and independently vertically adjustable means provided at circumferentially spaced points on said ring and supportably connected to said funnel, whereby the funnel may be selectively raised and lowered relative to the deflector and selectively tilted into and out of axial alignment with the deflector.

2. The device as defined in claim 1 wherein said means comprise a plurality of screw-threaded rods projecting upwardly from said ring, a plurality of apertured lugs secured to the upper end of said funnel and movable upwardly and downwardly on the respective rods, and adjusting nuts provided on said rods and engaging said lugs whereby to retain the same in a selected position thereon.

3. The device as defined in claim 2 wherein said adjusting nuts are provided with pairs of spaced flanges receiving said lugs therebetween.

References Cited in the file of this patent
UNITED STATES PATENTS

| | | |
|---|---|---|
| 1,026,035 | Hedden | May 14, 1912 |
| 1,173,451 | Mathews | Feb. 29, 1916 |
| 2,187,330 | Rudd | Jan. 16, 1940 |
| 2,687,892 | Kinesella | Aug. 31, 1954 |